United States Patent [19]

Iwashita et al.

[11] Patent Number: 5,695,816
[45] Date of Patent: Dec. 9, 1997

[54] PROCESS FOR THE PREPARATION OF CARBON FIBER REINFORCED CARBON COMPOSITES

[75] Inventors: Norio Iwashita; Yoshihiro Sawada, both of Ikeda, Japan

[73] Assignee: Agency of Industrial Science & Technology, Tokyo, Japan

[21] Appl. No.: 567,766

[22] Filed: Dec. 5, 1995

[30] Foreign Application Priority Data

Dec. 6, 1994 [JP] Japan .................................. 6-330695

[51] Int. Cl.⁶ .................................................... B05D 3/02
[52] U.S. Cl. .......................... 427/228; 427/227; 162/69; 162/7; 162/72; 264/29.3; 264/29.5; 264/29.1; 423/447.2; 423/447.7; 428/136; 428/179
[58] Field of Search ..................... 162/69, 70, 72; 264/29.5, 29.3, 29.1; 502/418; 523/400, 439, 454; 427/227, 228; 423/447.2, 447.7; 428/136, 179

[56] References Cited

U.S. PATENT DOCUMENTS 4,456,712 6/1984 Christie et al. ...................... 523/439

Primary Examiner—Richard Weisberger
Attorney, Agent, or Firm—Nikaido, Marmelstein Murray & Oram LLP

[57] ABSTRACT

The present invention aims at preventing or reducing the lowering in mechanical characteristics of a carbon fiber reinforced carbon composite due to stress orientation caused by the use of a thermosetting resin as a carbon matrix precursor resin to thereby obtain a carbon fiber reinforced carbon composite improved in mechanical characteristics, and for attaining this aim, provides a process for the preparation of a carbon fiber reinforced carbon composite which comprises impregnating a carbon fiber with a bismaleimide-triazine copolymer resin instead of the sizing agent and thermoplastic resin which have been used conventionally and heating the resulting impregnated carbon fiber in a non-oxidizing atmosphere to carbonize or graphitize the resin.

Further, the present invention provides also a process for the preparation of a carbon fiber reinforced carbon composite which is characterized in that a bismaleimide-triazine copolymer resin is used as the sizing agent to be applied prior to the impregnation of a carbon fiber with a thermosetting agent to thereby prevent or reduce the lowering in mechanical characteristics due to stress orientation of the carbon matrix formed or derived from the conventional thermosetting resin.

4 Claims, 5 Drawing Sheets

PROCESS FOR THE PREPARATION OF CARBON FIBER REINFORCED CARBON COMPOSITES

BACKGROUND OF THE INVENTION

The present invention relates to processes for the preparation of carbon fiber reinforced carbon composites.

Up to this time, there has been well known a process for the preparation of a carbon fiber reinforced carbon composite which comprises impregnating a bundle, mat or fabric of carbon fibers with a thermosetting resin such as phenolic or furan resin, curing the resin and heating the impregnated carbon fiber thus prepared in a non-oxidizing atmosphere to carbonize the resin. Hereinafter, the resin to be impregnated in carbon fibers will be called carbon matrix precursor. According to this process, there is observed a phenomenon that a stress occurs at the adhesive interface between the carbon fiber and the resin owing to the difference in thermal expansion coefficient between the carbon fiber and the resin and the shrinkage inherent in the resin and therefore the crystals of the carbon matrix formed are oriented along the perimeter of the fiber. This phenomenon is called "stress orientation". The carbon matrix suffering from such stress orientation exhibits mechanical properties varying upon the loading direction of stress, i.e., exhibits mechanical anisotropy.

Further, the graphitization of the carbon fiber reinforced carbon composite prepared by the above process by high-temperature treatment involves crystal growth in such an anisotropic matrix to result in forming an anisotropic graphitized matrix. The formation of such an anisotropic graphitized matrix causes a strain in the reinforcement carbon fiber itself or at the interface between the carbon fiber and the matrix to give a graphitized composite material which is lowered in mechanical characteristics (such as strength) and is easily oxidizable locally.

Up to this time, there has not been found any means for preventing the stress orientation phenomenon of a carbon matrix resulting from a thermosetting resin to give a graphitized composite improved in mechanical characteristics after high heat temperature treatment.

SUMMARY OF THE INVENTION

The present invention aims first at preventing or reducing the stress orientation of the carbon matrix of a carbon fiber reinforced carbon composite to improve the mechanical characteristics of the composite.

The present invention aims secondarily at improving the mechanical characteristics of a carbon fiber reinforced carbon composite wherein the carbon matrix suffers from stress orientation phenomenon.

In due consideration of these circumstances of the prior art, the inventors of the present invention have prepared carbon fiber reinforced composites by the use of various thermosetting resins as carbon matrix precursors and have evaluated the materials for mechanical characteristics. As a result of these studies, they have found that when a bismaleimide-triazine copolymer resin is used as the carbon matrix precursor of a carbon fiber reinforced composite, the crystals of the carbon matrix formed by carbonization are oriented completely at random to form a so-called glassy isotropic structure. Further, they have also found that the carbon fiber reinforced composite prepared with this copolymer resin exhibits a high strength even after high-temperature treatment.

Furthermore, they have also found that when a carbon fiber reinforced carbon composite is prepared by sizing carbon fiber with a bismaleimide-triazine copolymer resin (i.e., surface-coating carbon fiber with a bismaleimide-triazine copolymer resin in a small thickness), impregnating the coated carbon fiber with other thermosetting resin in a conventional manner and heating the resulting impregnated carbon fiber in a non-oxidizing atmosphere to carbonize the resin, the obtained composite exhibits improved mechanical properties even after high-temperature treatment, though its matrix suffers from stress orientation.

Namely, the process for the preparation of a carbon fiber reinforced carbon composite by which the above first aim of the present invention can be attained is one which comprises impregnating a carbon fiber with a resin and heating the impregnated carbon fiber in a non-oxidizing atmosphere to carbonize or graphitize the resin, characterized by using a bismaleimide-triazine copolymer resin as the resin.

Further, the process for the preparation of a carbon fiber reinforced carbon composite by which the second aim of the present invention can be attained is one which comprises impregnating a carbon fiber with a thermosetting resin and heating the impregnated carbon fiber in a non-oxidizing atmosphere to carbonize or graphitize the resin, characterized by sizing the carbon fiber with a bismaleimide-triazine copolymer resin prior to the impregnation.

In the above processes using a bismaleimide-triazine copolymer resin as the impregnant or sizing agent for carbon fiber, impregnation, heating and other treatments may be conducted according to the techniques of the prior art.

The carbon fiber to be used in the present invention is not particularly limited, but may be an arbitrary one prepared from coal pitch, petroleum pitch, poly-acrylonitrile resins or the like. Further, the preparation conditions and sizes of the carbon fiber are not particularly limited.

The bismaleimide-triazine copolymer resin to be used in the present invention is a material known in itself and is commercially available. In the present invention, a solution of a commercially available bismaleimide-triazine copolymer resin in a suitable polar solvent such as N-methyl-2-pyrrolidone is used in order to facilitate the impregnation of carbon fiber with the resin. The impregnation of carbon fiber is conducted by the use of this solution, followed by the evaporation of the solvent and the curing of the resin.

An example of the bismaleimide-triazine copolymer resin to be used in the present invention is as follows, though the copolymer resin is not limited to the following.

bismaleimide/triazine weight ratio: 1/9
specific gravity: 1.229(solid at room temperatures)
Glass transition temp. of product of curing: 250°–260° C.
specific heat: 0.34 kcal/kg·°C.
thermal conductivity: 0.135 kcal/m·h·°C.
thermal diffusivity: $3.41 \times 10^{-4}$ m$^3$/h
thermal expansion coefficient: $2.66 \times 10^{-6}$ °C.$^{-1}$ The polar solvent to be used in preparing the solution of a bismaleimide-triazine copolymer resin is not particularly limited, but may be any one as far as it can dissolve the copolymer resin. Examples of the solvent include N-methyl-2-pyrrolidone, methyl ethyl ketone and acetone.

According to an embodiment of the present invention, carbon fiber is dipped in a solution of a bis-maleimide-triazine copolymer resin in a polar solvent, followed by drying and curing; and the impregnated carbon fiber thus prepared is heat-treated in a non-oxidizing atmosphere (e.g., nitrogen atmosphere) at about 450° to about 1000° C., preferably at about 600° C. The volume fraction of carbon matrix in the composite is generally about 10 to about 90% by weight, preferably about 40 to about 70% by weight, though it varies depending on the physical properties required in the use of the material.

In the carbon fiber reinforced carbon composite prepared according this embodiment, the carbon matrix is present in the form of a glassy isotropic structure wherein the crystals are oriented completely at random.

According to another embodiment of the present invention, the surface coating of carbon fiber is conducted with a dilute (e.g., about 0.05 to about 5% by weight) solution of a bismaleimide-triazine copolymer resin, followed by drying and curing; the resulting carbon fiber having a thin resin coating layer on its surface (i.e., the sized carbon fiber) is then impregnated with a thermosetting resin which has been used in industrial production of carbon fiber reinforced composite materials (for example, phenolic or furan resin) as a main matrix precursor; and the resulting impregnated carbon fiber may be heat-treated in a non-oxidizing atmosphere (generally in a nitrogen atmosphere) under such conditions as described above. In this case, the thickness of the bismaleimide-triazine copolymer resin coating layer formed is as very small as 0.1 µm or below. The carbon fiber reinforced carbon composite prepared according to this embodiment has an advantage in that it exhibits improved mechanical properties even after high-temperature treatment, though its matrix suffers from stress orientation.

Further, it has now been found that no glassy isotropic structure is formed in the matrix of the carbon fiber reinforced carbon composite prepared by using a bismaleimide homopolymer resin instead of the bismaleimide-triazine copolymer resin. Accordingly, it is presumed that the triazine component of the resin may act greatly, though the detailed mechanism has not been elucidated as yet.

The above embodiment of the present invention using a bismaleimide-triazine copolymer resin as the main matrix precursor gives a novel carbon fiber reinforced carbon composite wherein the crystals of the carbon matrix are oriented at random to form a glassy isotropic structure.

This novel composite material is excellent in mechanical characteristics such as strength and modulus and in oxidation resistance and is therefore extremely useful as materials of gas turbine blade and aerospace and aircraft apparatus.

Further, the other embodiment of the present invention using a bismaleimide-triazine copolymer resin as sizing agent gives a carbon fiber reinforced carbon composite improved in mechanical strength even when the main matrix is prepared from a conventional matrix precursor resin which suffers from stress orientation.

DETAILED DESCRIPTION OF THE PREFERRED EMBODIMENTS

Examples will now be described to make the characteristics of the present invention more clear.

Example 1

High-modulus carbon fiber prepared from petroleum pitch (which was not sized with an epoxy resin, though a commercially available carbon fiber is generally sized therewith) was treated as follows.

Figure 1:
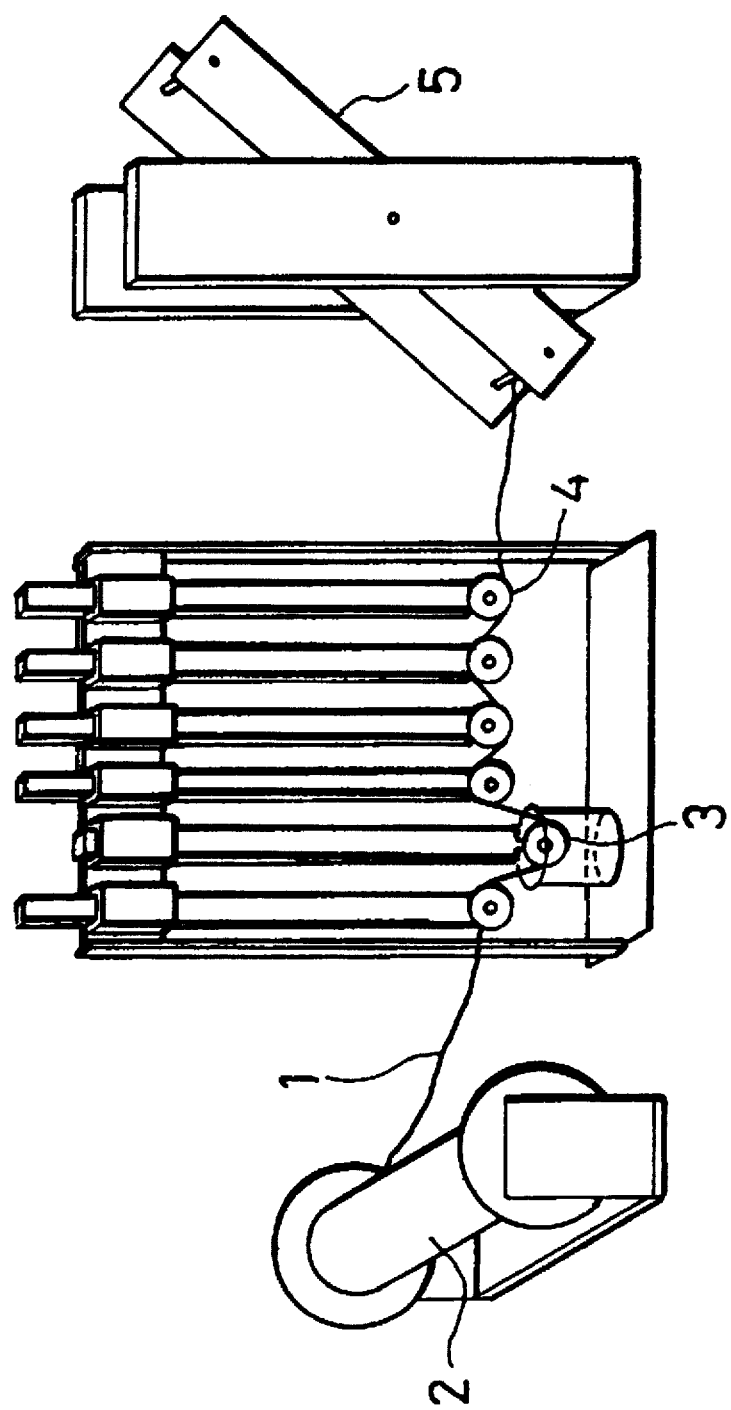
FIG. 1 is a perspective view, showing the apparatus used in Examples for impregnating carbon fiber bundle with a resin.

The resin impregnating apparatus perspectively shown in FIG. 1 was used. Carbon fiber bundle 1 (composed of 2000 single strands) was drawn out of a bobbin 2 and dipped in a bismaleimide-triazine copolymer resin solution 3 (solvent: N-methyl-2-pyrrolidone, concentration: 50% by weight). The resulting impregnated bundle was kneaded with a roller 4 and rolled round a metal reel 5 in such a way that rovings did not come into contact with each other. The carbon fiber bundle thus rolled round the metal reel 5 was heated in the open air from ordinary temperature to 150° C. at a temperature rise rate of 20° C./hr and kept at 150° C. for 2 hours to evaporate the solvent. The resulting impregnated carbon fiber roving was heated in an electric oven in a nitrogen atmosphere from 150° C. to 600° C. at a temperature rise rate of 10° C./hr and fired at 600° C. for 5 hours to conduct carbonization.

Separately, another carbonized composite material was prepared by repeating the same procedure as that described above and further graphitized by heating it up to 2600° C. in an electric oven in an argon atmosphere. In this graphitization, the temperature rise rate was 100° C./min up to 1000° C., 20° C./min within the range of 1000° to 2000° C. and 5° C./min within the range of 2000° to 2600° C.

The carbonized and graphitized composites thus prepared had a rodlike shape having a diameter of about 0.5 mm (i.e., the materials were similar to lead for mechanical pencil in appearance).

Figure 2:
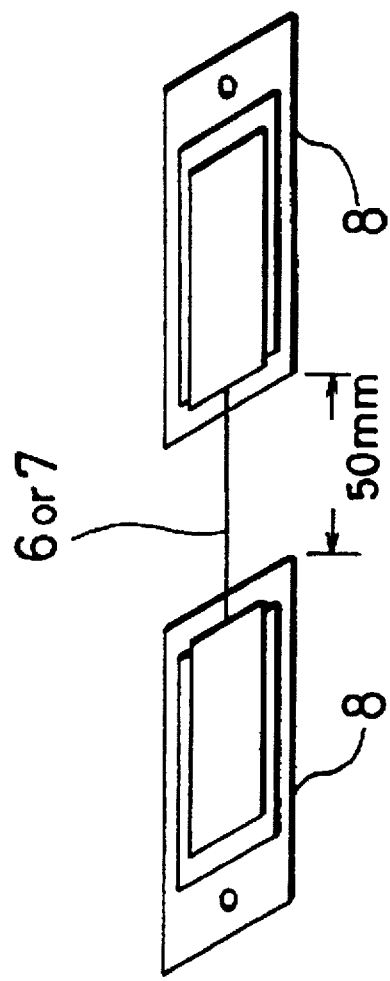
FIG. 2 is a perspective view, showing the embodiment of setting of carbon fiber reinforced carbon composite samples in the tensile test of Examples.

As perspectively shown in FIG. 2, the carbonized composite material 6 and the graphitized composite 7 were fixed on aluminum tabs 8 respectively with an epoxy adhesive with a gauge length of 50 mm. The resulting system was set on a tension tester of a material testing machine (not shown in the figure) and thereafter the tensile test of the specimens was conducted at a rate of pulling of 1 mm/min to record load-elongation curves.

Figure 3:
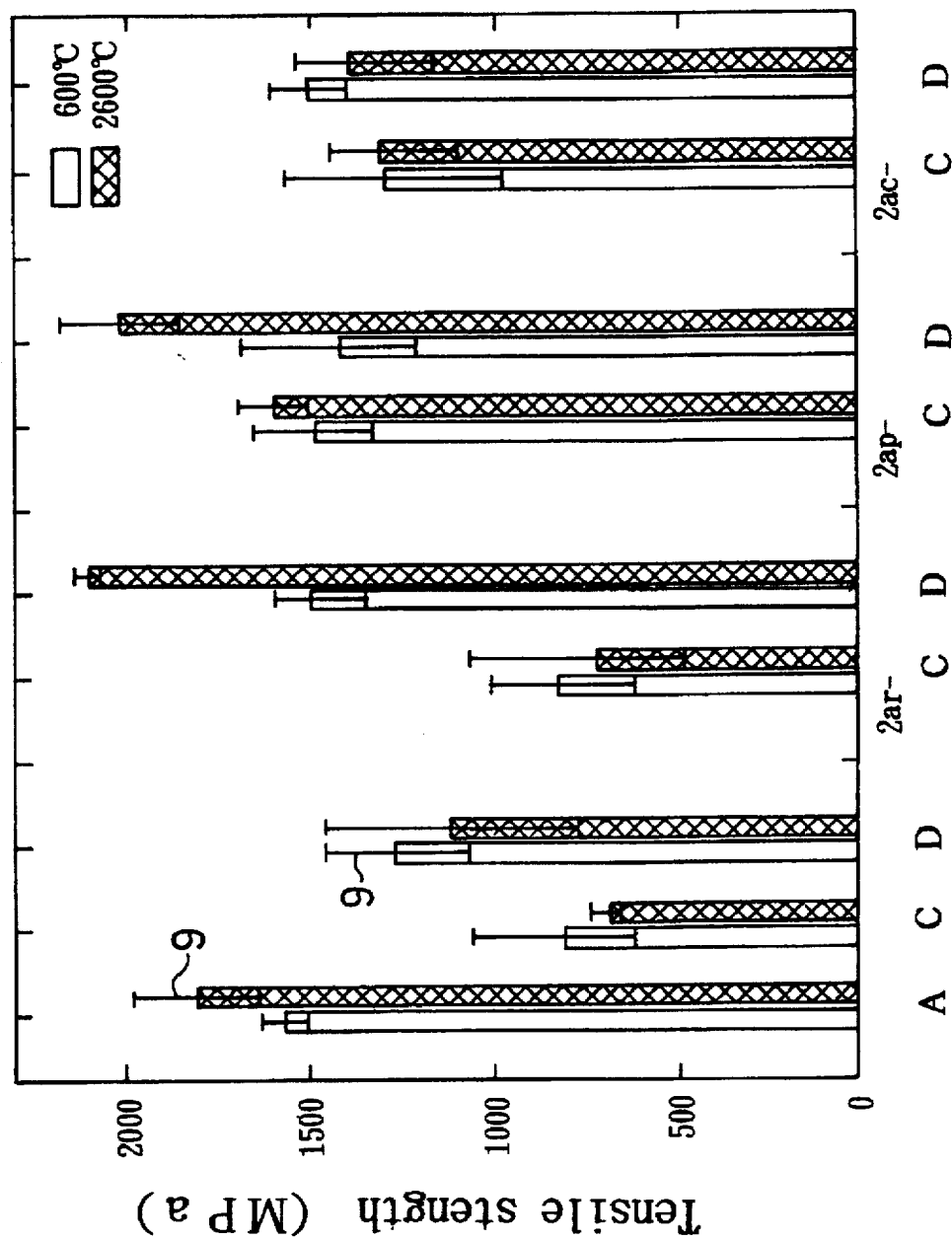
FIG. 3 is a graph, showing tensile strength values of carbon fiber reinforced carbon composites prepared in Examples.
Figure 4:
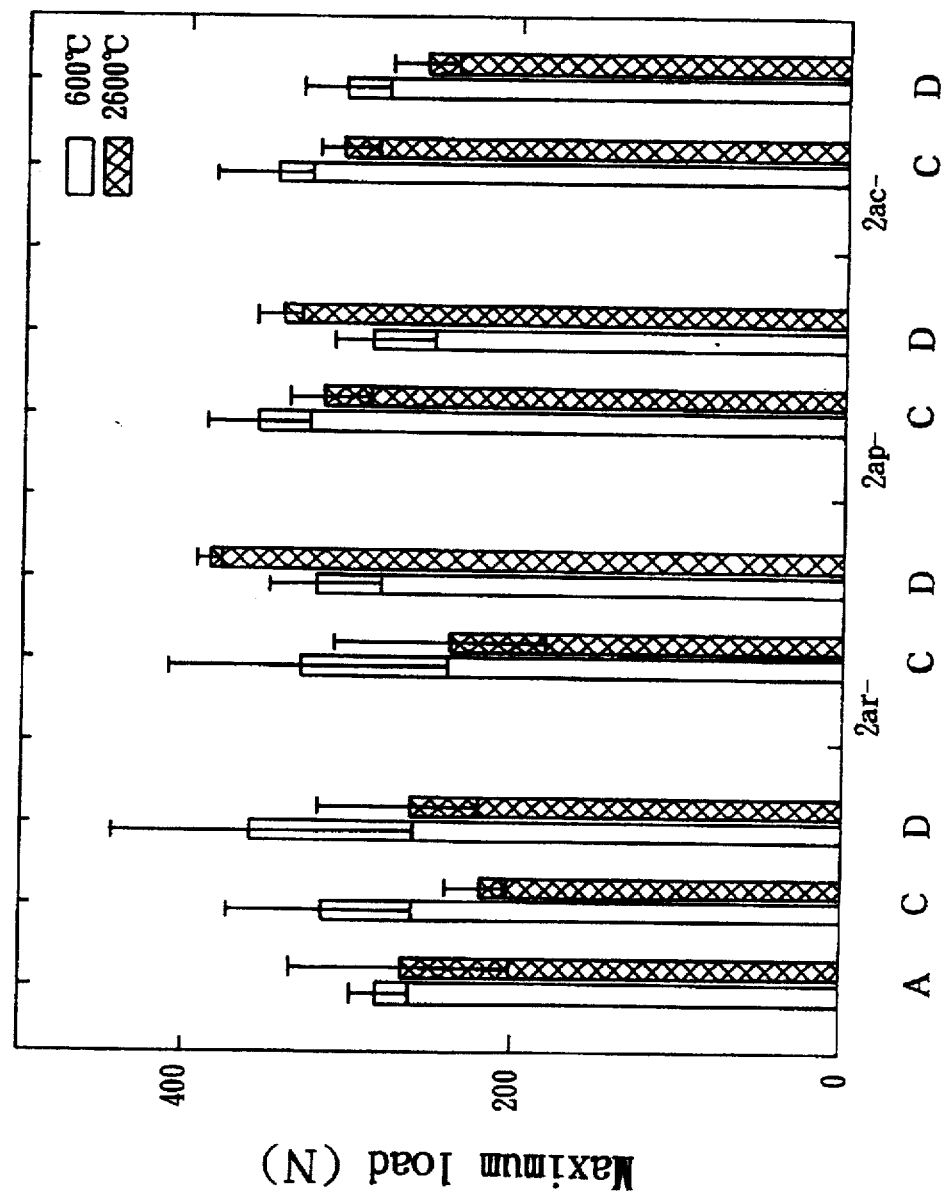
FIG. 4 is a graph, showing maximum load values of carbon fiber reinforced carbon composites prepared in Examples.
Figure 5:
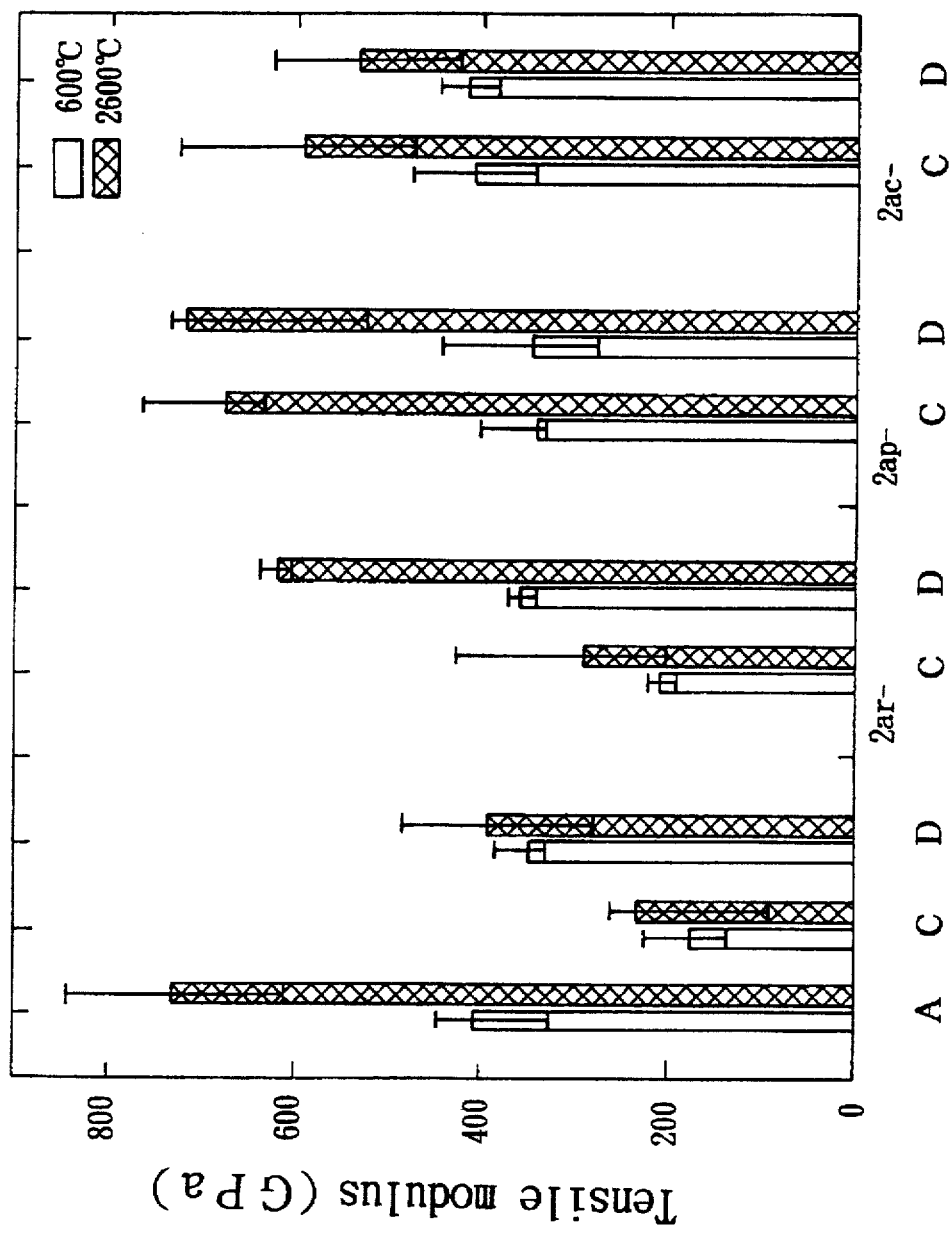
FIG. 5 is a graph, showing tensile modulus values of carbon fiber reinforced carbon composites prepared in Examples.

The mechanical characteristics of the above two composites are shown in FIGS. 3 to 5 by the bars A. In these figures, open bars show the data of carbonized composite materials and hatched bars show those of graphitized composite materials. Further, the lines 9 in FIG. 3 show the scatter range of the data and the bars show the averages of them.

The mechanical characteristics were determined as follows.

The cross-sectional area of each sample was determined from the weight per unit length and the density.

The maximum load refers to the maximum allowable load when a tensile load is applied.

The tensile strength of each sample was calculated from the maximum load observed in the tensile test and the cross-sectional area.

The tensile modulus of each sample was determined from the initial slant of the load-elongation curve.

As Comparative Examples, carbon fiber bundle was impregnated with a phenolic or furan resin; the resulting impregnated carbon fiber bundle was heated in the open air from ordinary temperature to 150° C. at a temperature rise rate of 20° C./hr and kept at 150° C. for 2 hours to evaporate the solvent; and the resulting impregnated carbon fiber was carbonized and graphitized in a similar manner to that of Example 1. The mechanical characteristics of the four heat-treated composites thus obtained are shown in FIGS. 3 to 5 wherein the bars C show the data observed in the cases using a phenolic resin and the bars D show those observed in the cases using a furan resin. The carbonization and graphitization in these Comparative Examples were conducted under the same conditions as those of Example 1.

Example 2

A 2% by weight solution of a bismaleimide-triazine copolymer resin in N-methyl-2-pyrrolidone was applied to the same carbon fiber bundle as that used in Example 1, and immediately thereafter, the resulting bundle was continuously impregnated with a phenolic or furan resin.

The obtained impregnated carbon fiber roving was heated in the open air from ordinary temperature to 150° C. at a temperature rise rate of 20° C./hr and kept at 150° C. for 2 hours to evaporate the solvent. The resulting impregnated carbon fiber was carbonized and graphitized in a similar manner to that of Example 1.

The mechanical characteristics of the four composites thus prepared are shown in FIGS. 3 to 5, wherein the bars 2ar-C show the data observed in the cases using a phenolic resin and the bars 2ar-D show those observed in the cases using a furan resin.

Example 3

A 2% by weight solution of a bismaleimide-triazine copolymer resin in N-methyl-2-pyrrolidone was applied to the surface of the same carbon fiber bundle as that used in Example 1 and the resulting coated bundle was heated in the open air from ordinary temperature to 150° C. at a temperature rise rate of 20° C./hr and kept at 150° C. for 2 hours to evaporate the solvent. The resulting carbon fiber bundle was impregnated with a phenolic or furan resin.

Then, the obtained impregnated carbon fiber roving was carbonized and graphitized in a similar manner to that of Example 1.

The mechanical characteristics of the four composites thus prepared are shown in FIGS. 3 to 5, wherein the bars 2ap-C show the data obtained in the cases using a phenolic resin and the bars 2ap-D show the data obtained in the cases using a furan resin.

Example 4

A 2% by weight solution of a bismaleimide-triazine copolymer resin in N-methyl-2-pyrrolidone was applied to the surface of the same carbon fiber bundle as that used in Example 1. The resulting coated bundle was heated in the open air from ordinary temperature to 150° C. at a temperature rise rate of 20° C./hr and kept at 150° C. for 2 hours to evaporate the solvent. The resulting coated bundle was heated in an electric oven in a nitrogen atmosphere from 150° C. to 600° C. at a temperature rise rate of 10° C./hr and fired at 600° C. for 5 hours to carbonize the resin.

The resulting coated bundle was impregnated with a phenolic or furan resin in a similar manner to that of Example 2, followed by carbonization and graphitization.

The mechanical characteristics of the four composites thus prepared are shown in FIGS. 3 to 5, wherein the bars 2ac-C show the data obtained in the cases using a phenolic resin and the bars 2ac-D show the data obtained in the cases using a furan resin.

Examination of the Results of Examples

The volume fractions of composites prepared above were estimated based on their cross-sectional areas and the results are given in Table 1. Further, the volume fractions were calculated according to the formula, 1−[cross-sectional area of fibers×number of single strands used (2000 in Examples)]/cross-sectional area of composites. However, the observation of the composites under a microscope revealed that the composites 2ac-C and 2ac-D contained carbon fiber in a state aggregating in the center more densely. Accordingly, the actual volume fractions of them are considerably smaller than those given in Table 1.

TABLE 1

| Composites | Volume fraction of matrix |
|---|---|
| A | 62% |
| C | 82% |
| D | 75% |
| 2ar-C | 82% |
| 2ar-D | 67% |
| 2ap-C | 71% |
| 2ap-D | 66% |
| 2ac-C | 75% |
| 2ac-D | 65% |

As understood from the results given in FIGS. 3 to 5, the carbon fiber reinforced carbon composites prepared by the process of the present invention using a bismaleimide-triazine copolymer resin as the main matrix precursor are remarkably improved in tensile strength and tensile modulus.

Further, when carbon fiber is sized with a bismaleimide-triazine copolymer resin by the 2ap method and thereafter impregnated with a phenolic resin (C) or a furan resin (D), the resulting composite materials [(2ap-C) and (2ap-D)] are improved in mechanical strength independent of the kind of the resin used as the impregnant. That is presumably because an extremely thin layer of glassy isotropic structure resulting from a bismaleimide-triazine copolymer resin lies over the interface between the fiber and the matrix.

When the sizing of carbon fiber with a bismaleimide-triazine copolymer resin was conducted by the 2ar method, only the composite material (2ar-D) prepared by the use of a furan resin as main matrix precursor exhibited an effect due to the sizing. This is presumably because the bismaleimide-triazine copolymer resin of uncured state is dissolved in the phenolic resin. When a resin having a high solvency against bismaleimide-triazine copolymer resin is used as matrix precursor, therefore, it is desirable that the sizing is conducted by the 2ap or 2ac method.

When the sizing of carbon fiber with a bismaleimide-triazine copolymer resin is conducted by the 2ac method, the resulting composites has a shortened distance between fibers as compared with that of the other materials, which is presumed to be a cause of bringing about improvement in their mechanical strength. The reason for this presumption is that the composites 2ar-D, 2ap-C and 2ap-D improved in mechanical strength exhibit remarkably improved tensile modulus after graphitization, while the graphitized composites prepared by the 2ac method are only a little improved in mechanical strength and modulus.

The carbon fiber reinforced carbon composite to be used as superhigh temperature materials must be heat-treated at a temperature higher than their service temperature. It can be understood from the above data that a carbon fiber reinforced carbon composite exhibiting improved industrial properties even after high-temperature treatment can be prepared by the process of the present invention which comprises surface-coating a carbon fiber with a bismaleimide-triazine copolymer resin, curing the resin and impregnating the resulting coated carbon fiber with an industrially inexpensive main matrix precursor resin.

What is claimed is:

1. A process for the preparation of carbon fiber reinforced carbon composite which comprises impregnating a carbon fiber with a solution of a matrix precursor resin and heating the impregnated carbon fiber in a non-oxidizing atmosphere to carbonize or graphitize the resin, said matrix precursor resin comprising a bismaleimide-triazine copolymer resin.

2. A process for the preparation of a carbon fiber reinforced carbon composite which comprises sizing a carbon fiber with a solution of a bismaleimide-triazine copolymer resin, then impregnating said carbon fiber with a thermosetting resin and heating the impregnated carbon fiber in a non-oxidizing atmosphere to carbonize or graphitize the resin.

3. A process as recited in claim 1 wherein said heating the impregnated carbon fiber in a non-oxidizing atmosphere is conducted at a temperature 450° C. or above.

4. A process as recited in claim 2, wherein said heating the impregnated carbon fiber in a non-oxidizing atmosphere is conducted at a temperature of 450° C. or above.

* * * * *